Patented Nov. 3, 1953

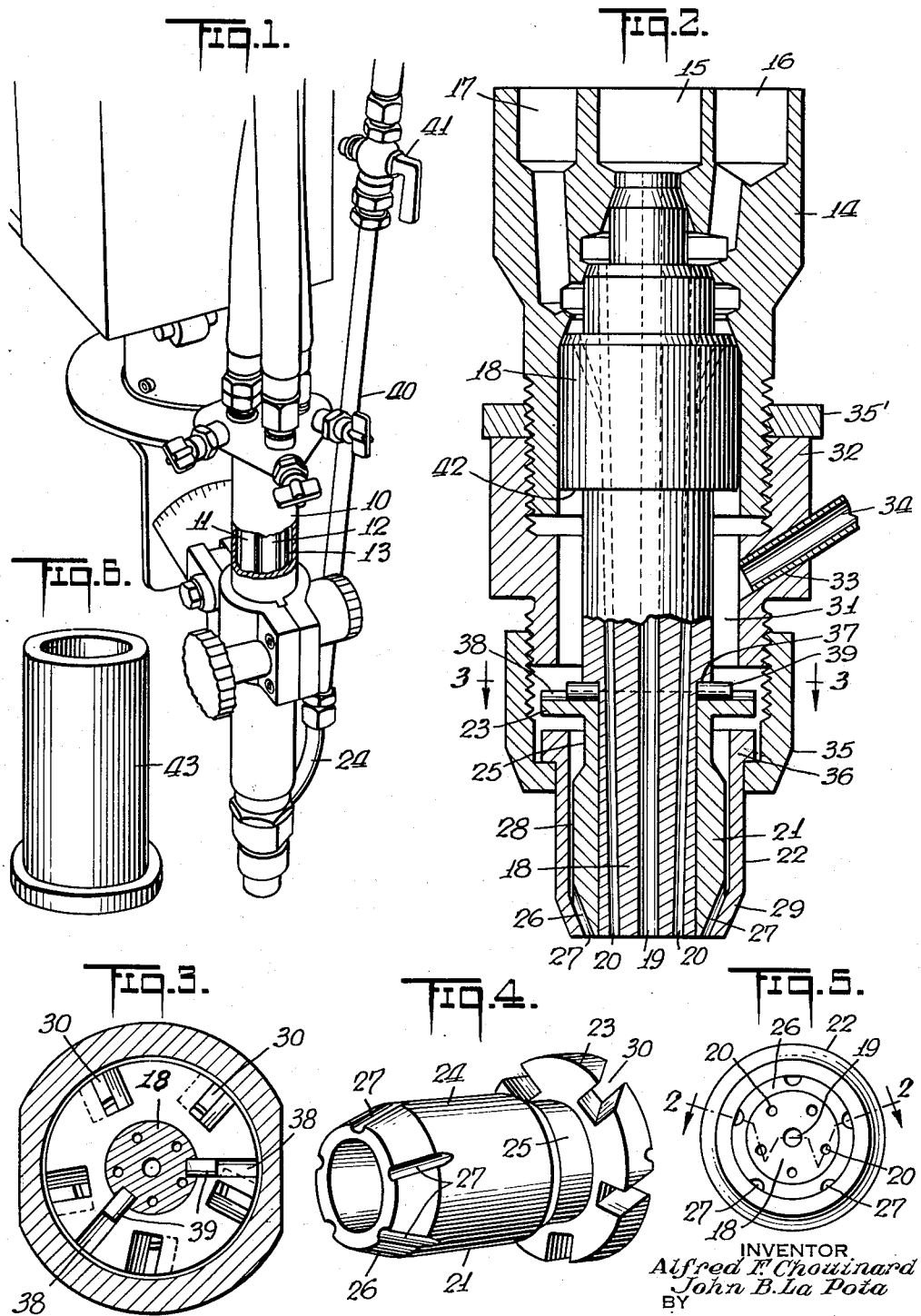

2,657,650

UNITED STATES PATENT OFFICE 2,657,650

TORCH FOR CUTTING STAINLESS STEEL

Alfred F. Chouinard and John B. La Pota, Chicago, Ill., assignors to National Cylinder Gas Company, Chicago, Ill., a corporation of Delaware Application May 21, 1947, Serial No. 749,412

7 Claims. (Cl. 110—22)

This invention relates to the cutting or perforating of stainless steel and other materials which are not readily cut by the use of a high pressure oxygen jet delivered along with an oxy-acetylene or other high temperature flame, but which may be effectively cut when iron or other powder which is combustible at high temperature, is delivered in finely divided form to the part to be cut or perforated, and at the point where the cutting or perforating is to be effected. A process for this general purpose is disclosed in the Harrison Patent 968,350, issued August 23, 1910.

The present invention relates particularly to the construction of the torch for delivering the high pressure oxygen, the flame forming gases, and the powdered flux material which has the desired high combustion temperature. For present purposes that material will be referred to as finely divided iron, iron powder or flux powder, but it will be obvious that in our improved apparatus other finely divided flux materials suitable for the purpose may be employed.

One object of the present invention is to provide an attachment or adapter which may be readily secured to and removed from a standard form of cutting torch, and by means of which the combustible powder may be delivered to the article to be cut.

A further object is to provide means whereby the powder is maintained in a free flowing condition, and in a state of agitation while passing through the adapter, so as to insure a free and uniform delivery to the point of use.

A further object is to provide means which insures the delivery of the powder or adjuvant material between the flames which are arranged around the high pressure oxygen stream, and insures the delivery of the powder inwardly to the point of impingement of the high pressure oxygen on the article to be cut, so that it is effectively ignited and burned by the high pressure oxygen, to thereby increase the temperature of the flame, effecting the desired cutting.

In the accompanying drawings we have illustrated one embodiment of our invention, but it will be obvious that various changes in the details of construction may be made without departing from the spirit of the invention or the scope of the appended claims. In these drawings:

Fig. 1 is a perspective view of a torch provided with an adapter and mounted on a suitable support.

Fig. 2 is a longitudinal section through the lower portion of the torch and the adapter attached thereto, and on the line 2—2 of Fig. 5.

Fig. 3 is a transverse section on the line 3—3 of Fig. 2, and showing the top of the sleeve of the adapter.

Fig. 4 is a perspective view of the sleeve.

Fig. 5 is a view of the end of the tip and some of the adapter parts and

Fig. 6 is a perspective view of a sleeve which may be employed in place of some of the adapter parts when the torch is to be used for ordinary cutting purposes.

The body portion 10 of the torch may be supported by hand or upon any suitable carriage. As illustrated, it is adjustably clamped to the end of a carriage of the type shown in the Chouinard Patent 2,336,596, or the Mott, Chouinard & Harding Patent 2,364,645, to permit raising and lowering of the torch, but it will be evident that it might equally well be secured to any other type of carriage such as that shown in the Mott, Chouinard & Dove Patent 2,417,511, or to any other suitable support.

The torch illustrated is provided with tubes 11, 12 and 13 for connection to hose which deliver the high pressure oxygen, the low pressure oxygen, and the acetylene or other combustible gas, and is provided with the usual control valves. In Fig. 2 a torch head 14 is shown with sockets 15, 16 and 17 receiving the said tubes, the socket 15 being for the high pressure oxygen and the sockets 16 and 17 for the low pressure oxygen and combustible gas. Within this head is secured the tip 18 which has the usual passages, the center one 19, shown in Fig. 5, being for the high pressure oxygen, and the annular row of passages 20 being for the combustible gas and low pressure oxygen, after being mixed in the tip in the conventional manner. So far as concerns these parts of the torch and tip, they may be of any suitable and well known form.

In carrying out our invention there is provided a sleeve 21 shown particularly in Fig. 4, and a jacket 22 which is separable therefrom and which encloses the sleeve.

The sleeve as shown in Fig. 4 has a peripheral flange 23 at its upper end, a cylindrical body portion 24, a somewhat reduced neck portion 25 between the flange and the body, and a tapered or conical terminal portion 26 provided with an annular row of grooves 27 extending lengthwise thereof and forming passages for the powder.

The external diameter of the body portion 24 is slightly less than the internal diameter of the body of the jacket, so as to leave a substantially cylindrical passage 28 therebetween, and the lower end of the jacket has a conical portion 29 which snugly fits the conical portion 26 of the sleeve and forms an outer wall for the grooves 27.

The number of grooves 27 corresponds to the number of flame outlets 20 at the end of the tip, and means are provided for insuring that each passage 27 comes approximately midway between two adjacent flame outlets 20, as shown particularly in Fig. 5, that is to say, each of the converging passages 27 for adjuvant material in the sleeve are radially and laterally offset from each of the adjacent passages 20 for combustible gaseous mixtures in the tip 18.

The flange 23 at the upper end of the sleeve has helically inclined passages 30 which establish communication between the annular passage 28 between the jacket 22 and the sleeve 21, and an annular passage 31 between the torch tip and a sleeve 32 which at its upper end is internally threaded to screw onto the torch head 14 and locked in place by a lock nut 35'. This sleeve at one side is provided with an inlet 33 to which may be connected a conduit 34 for the finely divided material. The upper end of the jacket terminates below the under side of the flange 23 on the sleeve, and the upper side of the flange engages a shoulder 37 on the tip. The lower end of the sleeve 32 is externally threaded, and there is provided a nut 35 having an inturned flange which engages the under side of a flange 36 on the jacket. Thus, upon assembling the parts as shown in Fig. 2, and tightening the nut 35, the nut acts through the flange 36 of the jacket to hold the conical lower portion of the jacket tightly against the conical grooved portion of the sleeve and hold the flange 23 of the sleeve tightly against the shoulder 37 of the tip, and thereby clamp the sleeve and jacket in place, and hold the tip tightly against its seat in the torch head.

In order to insure that the passages 27 are properly oriented or staggered in respect to the passages 20, any suitable means is provided which will prevent the clamping of the parts, except when the sleeve is rotated to the desired position. As shown, the upper end surface of the sleeve is provided with a pair of radial grooves 38, and the torch tip below the shoulder 37 is provided with a pair of pins 39 which are spaced apart angularly to the same distance as the grooves 38 and which together constitute interengaging means. Thus the sleeve can be properly seated against the end of the torch tip only with the two in the proper relative rotational positions, and which correspond to the desired positioning of the passages 27 in respect to the passages 20. The pins also prevent the interchange of various sleeves and tips which may have different numbers of preheat and flux passages.

The adjuvant material or powder, having a high combustion temperature, and which is preferably finely divided iron, is preferably carried along by a current of nitrogen, is delivered through a conduit 40 provided with a suitable valve 41, and detachably connected to the conduit 34 fixed on the sleeve 32.

In operation the high pressure oxygen and the flame producing gases are delivered and controlled in the same way as in an ordinary cutting torch. When it is necessary or desirable to employ the finely divided iron to increase the cutting temperature, to cut stainless steel or other such material which is not readily cut by an ordinary cutting torch, the valve 41 is opened and the stream of flux material in a current of carrier gas is delivered to the annular passage 31 and flows in a somewhat helical direction through the passages 30, and swirls around in the passage 28 until it reaches the outlet passages 27. From these it is delivered as streams or jets between the flames at the several outlets 20, and inwardly toward the stream of high pressure oxygen as it emerges from the torch tip into free space from the outlet 19, so that they pass with the high pressure oxygen directly against the article to be cut. The carrier gas may be nitrogen, but preferably is a mixture of nitrogen and hydrogen, as disclosed and claimed in a copending application, Serial No. 294,083.

It will be noted that the novel features of the present invention reside primarily in the provision of parts which may be readily attached to or removed from a standard cutting torch. Upon removing the sleeves 32 and 21, the jacket 22 and the nut 35 from the torch head, an ordinary tip clamping nut may be substituted, which will screw on the torch head 14 and which will engage an upper shoulder 42 and hold the latter in place, and the apparatus may be used as an ordinary cutting torch.

In case it is not desired to remove the sleeve 22, the nut 35 may be removed together with the sleeve 21 and jacket 22, and a sleeve 43, shown in Fig. 6, may be slipped up over the torch tip to engage the shoulder 42 of the latter, and the nut 35 then replaced to engage the lower end of the sleeve 43. Thus the conversion of the torch from a form suitable for ordinary cutting to a form suitable for cutting stainless steel, may be very quickly and easily effected.

Having thus described our invention what we claim as new and desire to secure by Letters Patent is:

1. A cutting torch having a cutting tip provided with a central high pressure oxygen passage and an annular row of passages for combustible gaseous mixtures, a sleeve encircling the delivery end portion of said tip and having an annular row of converging discharge passages at the delivery end, and interengaging means between said sleeve and said tip for insuring the staggered position of the passages of the two annular rows.

2. An adapter for application to a cutting torch to facilitate the cutting of stainless steel, said adapter including a sleeve for encircling the terminal portion of the torch tip and provided with a flange at the upper end, a jacket for encircling said sleeve and having a flange, said jacket and sleeve being spaced to form flux passages, and a nut for engaging the flange of said jacket for holding said jacket and sleeve in position, the flange of said sleeve having passages therethrough and the opposite end of said sleeve having converging grooves.

3. An adapter for application to a cutting torch to facilitate the cutting of stainless steel, said adapter including a sleeve for encircling the terminal portion of the torch tip and provided with a flange at the upper end and a jacket for encircling said sleeve and seating on the lower portion of said sleeve, a nut for detachably engaging the tip and for holding said jacket and sleeve in position, the flange of said sleeve having passages therethrough and the opposite end of said sleeve having converging grooves, and means for insuring a selected orientation of said sleeve in respect to said tip.

4. A cutting torch having a tip provided with a central oxygen passage and an annular row of combustible gas passages, an adapter encircling said tip and having a series of passages converging at their delivery ends, the number of converging passages in said adapter being the same as the number of combustible gas passages in said tip, and means for securing said adapter on said tip and insuring the staggered positioning of one set of passages with those of the other set.

5. A cutting torch having a tip provided with a central oxygen passage and an annular row of combustible gas passages, an adapter encircling said tip and having a series of passages converging at their delivery ends, the number of converging passages in said adapter being the same as the number of combustible gas passages in said tip, and means for securing said adapter on said tip and insuring the staggered positioning of one set of passages with those of the other set, said means including an interengaging projection and groove.

6. A cutting torch having a cutting tip provided with a central high pressure oxygen passage and an annular row of passages for combustible gaseous mixtures, a sleeve encircling at least the delivery end portion of said tip and having an annular row of converging discharge passages for adjuvant material at the delivery end of said sleeve, and means for insuring said sleeve and said tip against relative movement with each of the pasages for adjuvant material in said sleeve being radially and laterally offset with respect to each of the adjacent passages for combustible gaseous mixtures in said tip.

7. A cutting torch having a cutting tip provided with a central high pressure oxygen passage and an annular row of passages for combustible gaseous mixtures, a sleeve encircling at least the delivery end portion of said tip and having an annular row of converging discharge passages at the delivery end of said sleeve, and means for insuring a staggered positioning of the passages of the two annular rows.

ALFRED F. CHOUINARD.
JOHN B. LA POTA.

References Cited in the file of this patent

UNITED STATES PATENTS

| Number | Name | Date |
|---|---|---|
| 968,350 | Harrison | Aug. 23, 1910 |
| 1,606,013 | Wulff | Nov. 9, 1926 |
| 1,731,265 | Quelch | Oct. 15, 1929 |
| 2,210,402 | Gaines | Aug. 6, 1940 |
| 2,317,936 | Nicholson et al. | Apr. 27, 1943 |
| 2,415,815 | Deming | Feb. 18, 1947 |
| 2,444,900 | Meincke et al. | July 6, 1948 |
| 2,451,422 | Wagner | Oct. 12, 1948 |

FOREIGN PATENTS

| Number | Country | Date |
|---|---|---|
| 641/26 | Australia | Mar. 18, 1926 |
| 549,781 | Germany | May 2, 1932 |